Feb. 2, 1937.        R. PEALE, JR        2,069,326
MECHANISM FOR SEPARATING INTERMIXED DIVIDED MATERIALS
Original Filed March 25, 1926    3 Sheets-Sheet 1
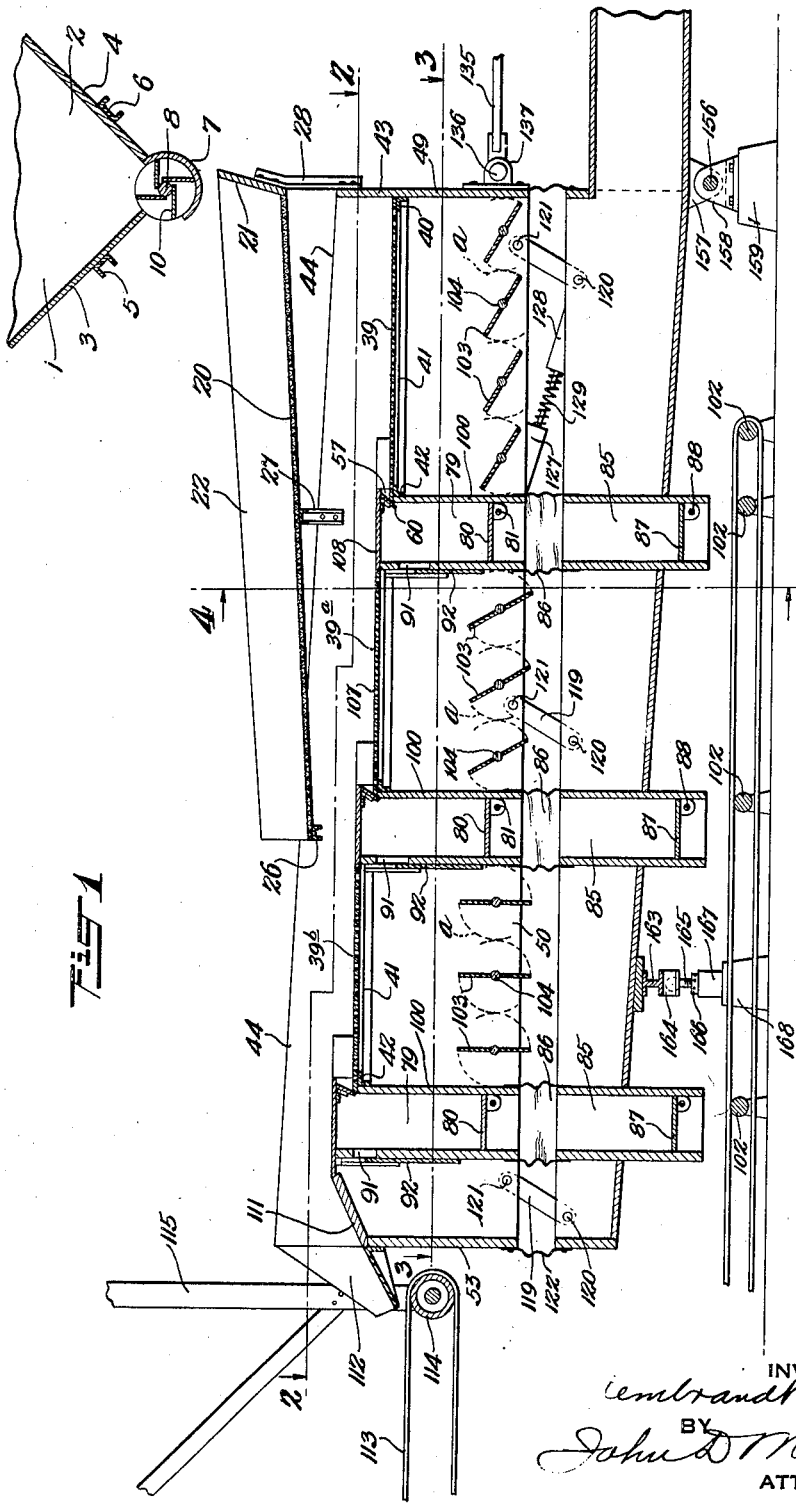
INVENTOR
Rembrandt Peale Jr.
BY John D Morgan
ATTORNEY

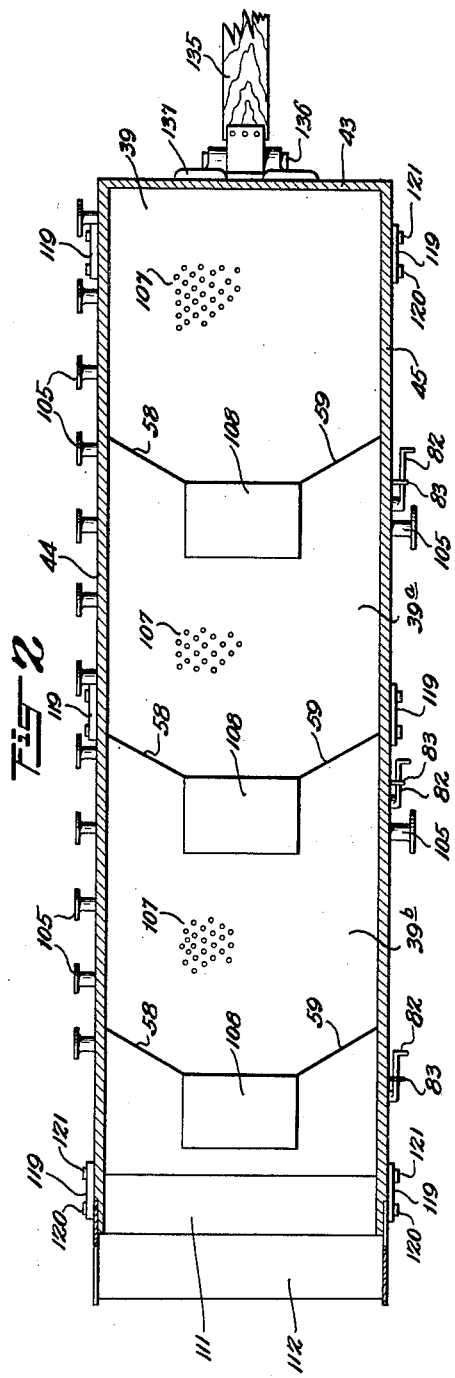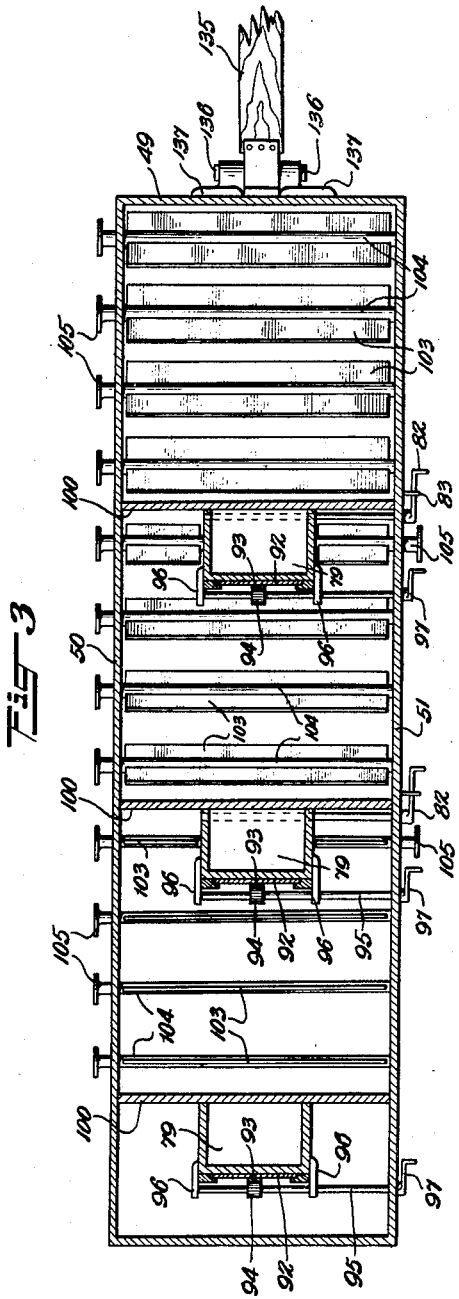

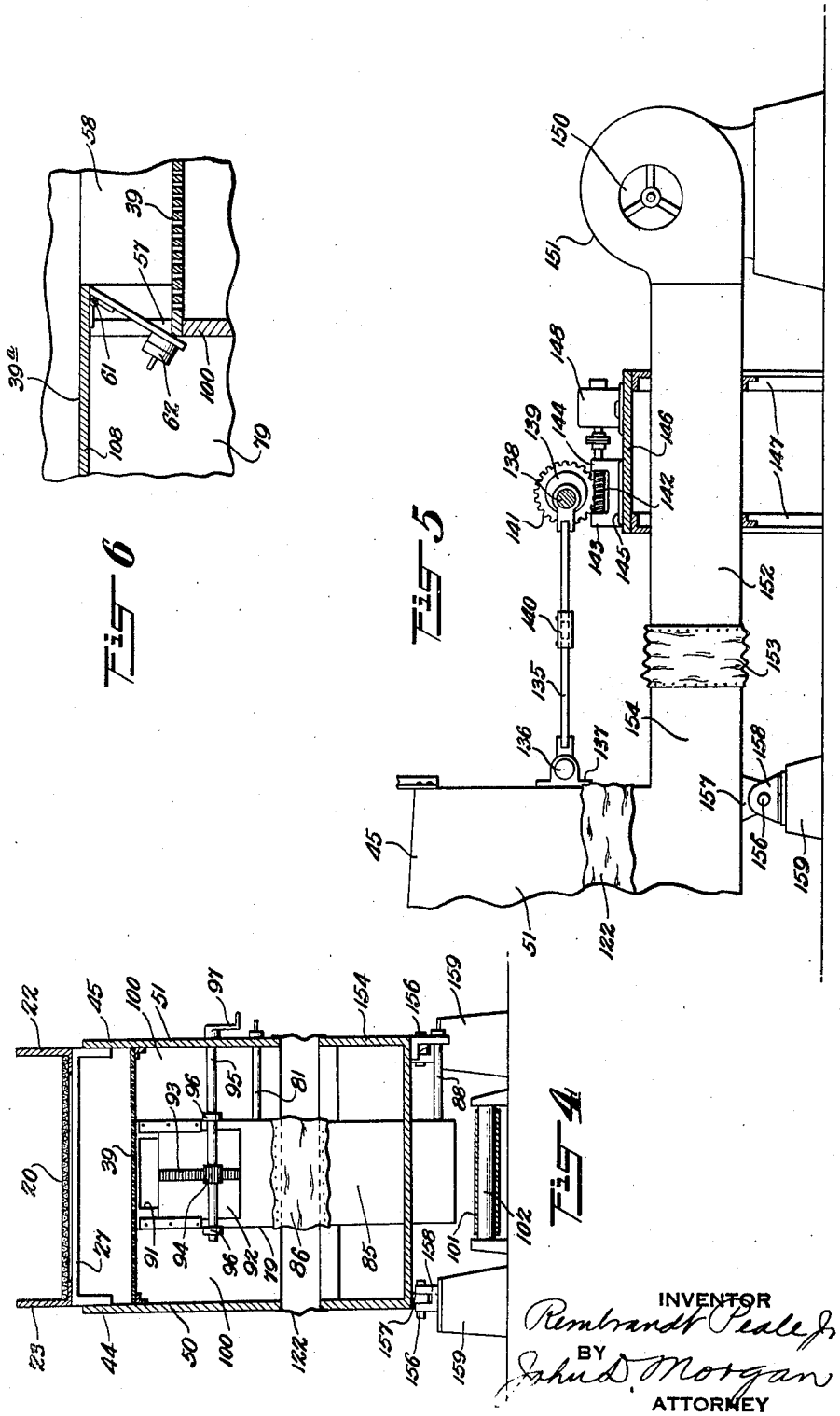

Patented Feb. 2, 1937

2,069,326

UNITED STATES PATENT OFFICE 2,069,326

MECHANISM FOR SEPARATING INTERMIXED DIVIDED MATERIALS

Rembrandt Peale, Jr., St. Benedict, Pa., assignor, by mesne assignments, to Peale-Davis Company, Wilmington, Del., a corporation of Delaware Original application March 25, 1926, Serial No. 97,222. Divided and this application April 6, 1931, Serial No. 528,012. Renewed September 21, 1935

1 Claim. (Cl. 209—502)

The invention is directed to novel and useful mechanisms for separating by air action intermixed divided materials of different specific gravities and more particularly to such mechanisms for controlling the force and direction of the air currents which pass through an air-pervious deck or table and the bed of intermixed materials thereon progressively undergoing separation or purification; the invention finding one of its important commercial applications in purifying unsized raw coal.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

This application is a division of my copending application Ser. No. 97,222, filed March 25, 1926, for "Process and mechanism for separating intermixed divided materials."

The accompanying drawings are copies of Figures 1, 2, 3, 4, 5, and 8 of my said application Ser. No. 97,222, and show the air controlling and directing mechanism disclosed in said parent application and claimed in this present application.

Fig. 1 is a central, vertical, longitudinal section through a mechanism embodying the invention;

Fig. 2 is a top plan, with certain parts in section, taken substantially on the line 2—2 of Fig. 1;

Fig. 3 is a full horizontal section taken on the line 3—3 of Fig. 1;

Fig. 4 is a full, transverse, vertical section, taken on the line 4—4 of Fig. 1;

Fig. 5 is a side elevation of the right-hand end of Fig. 1 and of the table-reciprocating means and the air current-creating means located to the right thereof but not shown therein; and Fig. 6 (Fig. 8 of said parent application) is an enlarged, vertical, sectional detail of one of the discharge-regulating devices for the heavier material, shown near the central part of Fig. 1.

The present invention provides a mechanism for controlling the amount and direction of the air currents supplied to the various parts or subareas of an air-pervious deck or table and forced through the bed of intermixed materials which is gradually moved forwardly, at the same time undergoing gradual stratification, separation and purification. The invention provides independent regulation or control of the amount, intensity and direction of the air currents, in localized sub-areas of the table and bed, as a very important and essential factor in the thorough and efficient separation and purification of the intermixed materials, especially with materials varying through a wide range of sizes, as well as having only small differences in their specific gravities. Rapid and successful commercial separation of materials of the kind indicated, such as raw coal which has not been closely pre-sized, presents a very difficult problem, requiring thorough control and nice regulation of the intensity, and of the direction as well, of the air currents.

The expression "intermixed divided materials" is used for convenience herein in designating a mixture comprising two or more materials in granular, fragmentary, pulverulent or other like state, whether natural or due to previous handling or operations. The expressions "heavier" and "lighter" as applied to the materials refer to the specific gravities of the materials.

The invention finds its widest and most important commercial application in the purification of so-called raw coal, that is, the mixture of coal, "bony", rock and other impurities, as it comes from the mine, coal of this character, through a wide range of sizes, being purified of its free impurities well within the standards of commercial requirements, and without previous preparation or sizing.

One of the principal and most valuable features of the present invention is the ability to practically completely separate or purify the mixture of coal, "bony", rock, and other impurities, without the preliminary sizing which has heretofore been necessary and which constitute a tremendous, and often prohibitive, item of labor and expense. By my invention, I am enabled to practically completely separate the coal, "bony" and rock, as it comes from the mine, from the finest dust up to pieces three inches in dimension, by a single operation and by running it in very large volumes over only a single cleaning table, the coal going direct to the cars, and the rock to the rock pile, and the "bony" being handled in any way desired.

The present invention contributes largely to dispensing with all preliminary sizing, and the screening mechanisms required therefor in the prior art, and dispenses with the large number of separating tables necessarily employed for cleaning the so pre-classified raw coal. I use only a single large separating table, and over this single table I send the unprepared, unsized, intermixed raw coal, which in the prior practice was necessarily sent first over the several screening or sizing mechanisms and then over the corresponding separating tables, as already described.

My invention is applied to the separation or purification of a continuous and forwardly-flowing bed of the unsized mixture of coal, bony, rock and other impurities, the bed undergoing separation being supported upon an air-pervious table, through which currents of air are driven from beneath the deck upwardly through the bed of materials, the bed at the same time being rapidly moved or reciprocated to mechanically progress the bed slowly forwardly, and to move, by friction and inertia, toward a place of delivery, the settled heavier impurities which have come to rest upon the table, the gradation or control of the force of the air currents cooperating in the novel manner herein set forth to accomplish the desired result.

In the type of table to which the present invention is shown applied in my said parent application, Ser. No. 97,222, the process of separation or purification by stratification is continuous and progressive along the continuously-maintained bed of materials, the settled heavier materials or impurities being diverted from the bed preferably in a plurality of relatively small streams, and the upper stratum of clean, lighter coal, traveling longitudinally forwardly along the bed in a single stream.

In said illustrative embodiment of the invention, the raw coal or like impure material is fed at such rate as to build up at the beginning, and thereafter to continuously maintain upon the table, a bed of materials of substantially uniform thickness, which moves gradually forwardly over the table. The materials undergo a continuous and progressive separation, due to the mechanical action, and the action of the variably regulated air currents, with the cooperation of the mechanical instrumentalities, and as the bed moves forwardly, gradually approach complete separation, which is effected before the separated materials are delivered from the table. By the action of the agencies and instrumentalities referred to, the intermixed particles or fragments are loosened apart and separated from each other, and the lighter material gradually forms a flotant top stratum and the heavier material gradually settles and comes to rest upon the table, and thereafter is progressed forwardly by the combined action of friction and inertia to a place of delivery, the paths of travel of the separated strata and the manner of discharge thereof, as broadly indicated, cooperating to facilitate practically perfect separation, rapid action and large output.

In the preferred embodiment, the air chamber beneath the air-pervious deck or table, is preferably divided into a plurality of sub-chambers and the passage of the air currents through the various sub-chambers is regulated independently of the other sub-chambers. The amount and direction of the air currents passing through the deck and the bed of coal in the area forming the top of each chamber is nicely controlled by devices which regulate the amount and direction of the air currents which enter the chamber. Preferably a series of baffles or vanes are movably mounted in the vibrating or reciprocating air chamber, and are thus positionable to control the air currents between zero and full force thereof.

The construction and manner of operation of the present invention for controlling the air current action upon a bed of materials, will be described exemplarily in connection with the particular type of separating table shown and described in said parent application, Ser. No. 97,222.

Referring now in detail to the present preferred embodiment of the invention, illustrated by way of example in the accompanying drawings, means are provided for supplying the intermixed, divided materials at such rate, and in such quantity, as will preserve upon the table a bed of materials undergoing stratification and separation of the desired or required thickness. In the embodied form of material-supplying means, a hopper 1 is provided, having side walls 2, and inwardly and downwardly inclined front and rear walls 3 and 4. The hopper is supported by suitable means, such as cross beams 5 and 6. The hopper is preferably of such width as to feed on the intermixed divided materials entirely across, or substantially entirely across the width of the rear end of the table, but the feed may be narrower if desired.

The lower end of the hopper has an opening therein, and beneath this opening is a horizontally-disposed, hemi-cylindrical plate 7, having a material discharging opening at the front side thereof. The material discharge regulating devices comprise a horizontally-extending shaft 8, located within the plate 7, and suitably journaled at either end thereof. Fixed to the shaft 8 are a plurality of spaced-apart discs 9. Fixed to, and extending between, the discs 9 are a plurality of horizontally-extending feed plates 10, which are preferably arranged tangentially to the shaft 8. A variable speed driving means for rotating the shaft 8 is provided, of any known or suitable form, whereby the speed of the discharge of materials from the hopper 1 to the table may be nicely regulated as desired.

The preferred form of the invention will be described as employing the broad sorting device, although it will be understood that the use of this device is entirely optional so far as concerns most features of the invention. When the sorting device is dispensed with, there may be a chute for directing the intermixed materials directly from the feed regulating means, already described, to the bed upon the table, or the hopper may be arranged and located more closely to the table.

The embodied form of the sorting device shown in Fig. 1 comprises a screen 20, having a transversely-disposed rear end wall 21, and two side walls 22 and 23, the front end of the screen being open. The bottom 20 is composed of bars or meshes of various sizes, whereby the pieces of the intermixed materials within very wide size limits are deposited on various areas of the bed of materials, as may be found most efficient in separating the particular kind and condition of intermixed materials. The sorting device is detachably mounted, by means of bolts or otherwise, upon a series of supports 26, 27, and 28, which are mounted upon the table structure. With the arrangement shown in Fig. 1, the finer or smaller pieces of intermixed materials are fed to the rear end of the bed of materials being separated upon the table, an intermediate size being fed to an area forwardly along the table, and the larger sizes of the intermixed materials being fed toward the forward end of the table. A reverse arrangement will be later described.

In the arrangement of Fig. 1, the materials within a predetermined range of sizes are delivered all over one of the zones or areas of the table. If the sorter is reversed, the places of discharge of the various sizes will also be reversed.

In the embodied form of my invention, the table and the upper portion of the air chamber reciprocate together, while the lower part of the air chamber is stationary. Means are provided for varying the air-current action through the bed of materials, and this variation in the air current action may be effected by varying the perviosity of the table in different areas thereof, or by varying the intensity of the air pressure in different sections or compartments of the air chamber, or it may be effected by a combination or cooperation of these. The claims of this divisional application cover the means for controlling and varying the air current intensity, and direction, in the compartments of the air chamber.

In accordance with certain features of the invention, and as already indicated, the table is divided into a plurality of separating areas, there being discharge means for the heavier stratified and separated materials for each of these areas, there being also optional discharge means for the lighter and superior stratified material for each such table zone or area.

As embodied, beginning at the rear end of the table, a separating table zone or area 39 is provided, consisting of a perforated metal plate, or wire mesh, or other suitable material, for permitting the air currents to pass therethrough and through the bed of materials above. The plate 39 is supported in any suitable manner, as by angle frame members 40 at the end, and 41 at the sides, and 42 at the front, the angle strips being attached to the side walls of the air chamber. The plate 39 is thereby detachably mounted and is interchangeable with other plates of the same or different degrees of air perviosity as may be desired or required.

The table is provided with a transversely-disposed, upwardly-extending rear retaining wall 43 for the bed of materials thereon, and also with upwardly - extending, longitudinally - disposed side-edge, bed-retaining walls 44 and 45, for maintaining the bed of materials upon the table. As a convenience in structure, the retaining walls for the bed of materials upon the table may be an integral continuation of the transversely-disposed rear wall 49, and the longitudinally-disposed side walls 50 and 51, of the vibratable or reciprocable part of the air chamber. The air chamber is also provided with a transversely disposed front wall 53.

At the forward or front edge of the zone or area 39 of the table, means are provided for discharging the heavier material in so far as it has become stratified and separated upon the table 39. In the embodied form of such means, a transversely-disposed opening 57 is provided extending for a relatively short distance across the front end of the part 39. At either side of the opening 57 there is a vertically-disposed wall, or guide portions 58 and 59, extending from the opening to the side walls 50 and 51, and being preferably inclined inwardly and forwardly from the side walls to the adjacent side of the opening 57.

In cooperation with the opening 57, means are provided for regulating the discharge of the rock or other heavier material through the opening. Thus all of the rock or other heavier material which has become stratified on the area 39, and is consequently at rest upon the table, will be discharged at this point, while all the separated lighter-material, and those portions of the material which are still intermixed, will be prevented from discharging at this point. In the embodied form of such means, a gate 60 is hinged at 61 along its top edge, which may be regulably set, as by weights 62, to control the discharge of the material as desired.

Means are provided for causing a back air pressure against the rock or other material at the gate 60, when desired, and also devices for discharging the rock without interfering with the operation of the air chamber. In accordance with this feature of the invention, the rock, or like material discharges through opening 57 into a vertically-disposed chamber 79, located just ahead of the opening 57, and in the central part of the table. The separated rock or other heavier material from the area 39 is discharged into this chamber 79. To control the discharge of the separated rock from the chamber, a bottom gate 80 is provided, fixed to a shaft 81, journaled in the side walls of the air chamber. The shaft 81 has a crank arm 82 at the end thereof, and located on the exterior of the machine, and a pin 83 is insertable in and removable from a hole in the side wall of the air chamber, whereby the gate 80 is retained in horizontal position but on occasion may be swung to vertical position to discharge the rock from the chamber 79.

The chamber 79 is directly above another vertically-disposed chamber 85, preferably of similar size and shape built into the stationary or non-reciprocable part of the air chamber, and there is a flexible, air-impervious connection 86 between the bottom end of chamber 79 and the top end of chamber 85. In the bottom part of the chamber 85 is a horizontally-disposed gate 87, fixed on a shaft 88, journaled in the side walls of the chamber. The shaft 88 has an arm thereon similar to the arm 82, and the retaining pin 83 to hold the gate 80 in horizontal position.

To provide air-pressure against the gate 60 of the opening 57, there is an opening 91 from the air chamber into the chamber 79, and a closure 92 of any suitable form may be provided which is regulably positionable to control the air action in the chamber 79 against the gate 60, and against the rock or other heavier material, which is being discharged through the opening 57. As embodied (Figs. 1, 3, and 4) the sliding closure 92 has a rack 93 thereon, and a pinion 94 meshing therewith. Pinion 94 is fixed on a shaft 95, journaled at 96 on the walls of the box 79. Shaft 95 extends outside the air chamber and has a crank arm 97 on this exterior end.

After a mass of rock has accumulated in the chamber 79, the pin 83 may be withdrawn, and the gate 80 will be rocked to discharge the rock into the chamber 85 where it will rest upon the gate 87. The gate 80 will be again closed and secured after the discharge of the rock, thereby cutting off the air pressure from the chamber 85. The gate 87 may then be swung to discharge the rock from the chamber 85 onto an endless conveyor belt 101, which runs over a plurality of guide rollers 102, to convey the discharged rock away to any convenient place of discharge.

As one means for regulating the air pressure action through the bed of materials, a plurality of adjustable baffles 103 are shown, disposed transversely in the air chamber, and fixed respectively on a shaft 104, journaled in the walls of the air chamber. The shaft 104 is provided externally of the chamber with means for positioning the baffles to control the air current action in the zone 39 of the table, such as hand wheels 105. In Figs. 1 and 3, the baffles or vanes 103 are shown extending completely across from one vertical wall 50 to the other vertical wall 51 of the air chamber, and adjacently located as a longitudinal series extending in substantially the same horizontal plane lengthwise of the air chamber. As shown in Fig. 3, the baffles or vanes 103 are positioned and proportioned so that when the respective adjacent baffles or vanes are turned into the horizontal position, their adjacent edges abut or overlap. For example, if the group of baffles or vanes 103 at the right hand end of Figs. 1 and 4 were turned somewhat farther in a counter-clockwise direction, their adjacent edges would substantially abut or overlap, as shown by the dotted lines in Fig. 1. In that position, the baffles or vanes constitute a substantially complete cut off for the air currents in the corresponding part or area of the table.

The intensity of air current action in such area will be determined by the number of the baffles or vanes 103 which are turned into any desired or required angular position. When the members 103 are turned to the vertical position, as shown at the left hand end of Figs. 1 and 3, the members 103 permit substantially the full volume of the air currents to pass upwardly to the air-pervious table. The vanes or baffles 103 can be turned to any desired intermediate positions or extent between the vertical and horizontal, and in any combinations, in the various chambers, and for any particular areas of the table, as desired. Furthermore, the members 103 may be inclined in either direction, that is, with their upper edges directed either forwardly or backwardly with respect to the front and rear ends of the table. As shown in Figs. 1, 3, 4, and 6, the vibratable or reciprocable part of the air chamber is divided by a plurality of partitions or walls 100; these, as embodied, forming a plurality of separate sub-chambers just beneath the air-pervious deck. The baffles or vanes 103 as shown are mounted in the lower part of the various chambers thus formed by the partitions or walls 100, and when in a horizontal position, they form a floor for the chamber. The air chamber is, as described, preferably formed into a plurality of sub-chambers, in each of which, independently of the others, the amount, and also the direction, of the air currents may be varied in any degree between being wide open and being entirely cut off, by the setting of the baffles or vanes 103 in each of the sub-chambers, irrespective of the air current settings in the other chambers, as indicated by the arms a, Fig. 1. Thus, the amount of the air currents passing through them for any desired area, and any desired part, of the air-pervious table can be closely regulated, and the air currents for the various selected areas and parts of the table can be likewise deflected and directed as may be desired. Also the air current pressure or action through the bed of coal undergoing purification may be regulated in any desired number of areas of the table, that is, practically within the smallest or greatest areas necessary in commercial operation, to meet difficult and changing conditions of the bed, such as differences in thickness of different parts of the bed, the proportions of different sizes of coal in any particular areas of the bed or any other conditions of commercial coal purification.

In the embodied form of reciprocable table, the baffles or vanes 103 are mounted in the upper part of the air chamber, and in the sub-chambers, which reciprocates with the table, and by means of the hand wheels 105 they may be regulated as minutely as desired while the table is running.

The separating table comprises a plurality of successive zones or areas 39, 39ª, and 39ᵇ, having the same manner of operation, and, preferably, substantially the same structure as that already described, and the various structural features common to the successive zones or parts of the table will be indicated by the same reference numerals.

The second separating zone or area 107 (39ª) of the table may be air pervious throughout its entire extent, but preferably the portion 108 thereof, which constitutes the top of the chamber 79 is preferably air impervious for the purpose of avoiding disturbance or complication of the air pressure control within the chamber 79 and against the gate 60. It will be understood, however, that the desired action and function as already outlined may be effected with regard to the material discharging from the area 89 into the chamber 79 and at the same time have an upward air action through the part 108, just above the chamber 79.

In the embodiment illustrated in Fig. 1, and as already described, the superior stratum of separated lighter material, such as coal, is entirely discharged from the forward end of the table. For this purpose at the forward end of the table, there is provided a downwardly-inclined chute 111, extending entirely across the table, and having an extension 112 discharging onto an endless conveyor belt 113 journaled to run over rollers 114, which are mounted in a suitable frame 115. In accordance with certain features of the invention, however, means are provided for discharging the superior stratum of separated coal or other lighter material, from the different areas where portions thereof have been separated and stratified, and this feature of the invention will be later described.

Referring now to the mounting of the table and upper part of the air chamber for reciprocation, a plurality of supporting arms 119 are pivoted at their bottom ends 120 to the upper part of the side walls 121 of the non-vibratable part of the air chamber. The arms 119 at their upper ends 121 are pivotally connected to the lower part of the respective side walls 50 and 51 of the reciprocable or vibratable part of the air chamber. A flexible air-impervious envelope 122 has its lower edges making air-tight connection with the upper edges of the non-reciprocable part of the air chamber entirely thereabout, and has its upper edges making a like air-tight connection with the lower edges of the reciprocable part of the air chamber.

Suitable cushioning means are preferably applied to the bed to control or ease the vibration thereof, and this means may be of any known or suitable form. As embodied, inclined blocks 127 are shown fixed to the under surface of the side walls of the reciprocable air chamber and corresponding disposed blocks 128 are fixed to the upper edge of the lower or non-reciprocable part of the air chamber. Coil springs 129 are in compression between these blocks and may be provided with tension-regulating devices of any known or suitable form as may be desired. If desired, or required also, reversely acting spring cushion means may be provided.

Any form of table-actuating or reciprocating means may be provided, so far as concerns most features of the invention. As embodied, a heavy link 135 has a pivotal connection at 136 with a bracket 137, fixed to the lower part of the rear end wall of the reciprocable portion of the air chamber. At its opposite end the link 135 is connected at 138 with a wrist pin, eccentrically carried by crank plates 139, suitably journaled on a supporting structure. The link 135 is also preferably provided with a length adjustment 140.

The embodied form of driving means comprises a worm-wheel 141 fixed on the shaft of the crank plate 139, and it meshes with a worm 142, having bearings 143 and 144 in a bed plate 145, carried upon a support 146, which in turn is carried on supports 147 from the floor. The worm 142 is driven by a motor 148. It will be understood, however, that any known or suitable form of speed-reducing, power-transmitting connections may be used between the motor and the table reciprocating mechanism as may be found suitable or desirable.

The air current or air-pressure creating means, in the embodied form, comprises a blower 150, mounted in a housing 151, which discharges the air current into a conduit 152. In accordance with one feature of the invention, the entire table is relatively inclinable, to vary and control the separating action, this means being preferably applied to the non-reciprocable part of the air chamber. With this in view, there is a flexible, air-impervious connection 153 between the air-current conduit 152 and the part 154 of the conduit, which latter discharges into the non-reciprocable part of the air chamber.

The non-reciprocable part of the air chamber is provided with pivotal mountings 155 and 156 near the rear end of the side edges thereof, said mountings comprising pins 156 carried in brackets 157, fixed to the air-chamber structure, and extending downwardly therefrom. Pins 156 are also journaled in brackets 158 carried on supports 159. Near the forward end of the air chamber there is a cross beam 163, upon which the chamber rests, and near either end of the beam 163 are ball-and-socket bearings 164, provided with downwardly-extending, screw-threaded rods 165. Threaded on the respective rods 165 are nuts 166, resting upon the top face of cylinders 167, carried on supports 168. By turning the nuts 166, the air chamber and table will rock about the pivots 166, and the inclination of the table will be varied or regulated as desired.

In the operation of the devices, it will be understood that the use of the different instrumentalities will be regulated and coordinated, dependent upon the kinds and conditions of the intermixed, divided materials to be separated. In the capacity for varying the manner and degree of correlation and cooperation of the various instrumentalities to meet the varying requirements of successful and approximately complete separation with different kinds and conditions of intermixed materials lies in part the value of the invention.

The table may be assumed to be in operation, with a bed of intermixed, divided materials thereon gradually undergoing stratification and separation. The materials will be fed continuously to the bed at such rate as will maintain the bed of materials of the desired thickness upon the table, the materials gradually traveling forwardly and becoming more and more completely separated. When the screen, or other broad sorting device 20 is employed, it can be arranged to deliver a fairly wide range of sizes to the bed in each separating area of the table. This delivery of the material to the table may be entirely across the width thereof, or may be only to the central part thereof.

The hopper and screen may be also positioned relatively to the table, so that either the smaller sizes may be delivered to the rear separating area and larger sizes to the areas respectively forwardly, or vice versa. Likewise, the degree of air-perviosity may be varied in the different separating areas of the table, and with certain intermixed materials, it is more efficacious to have the air-perviosity of the table increasing gradually forwardly, either from zone to zone, or also gradually within or throughout the particular zones.

As the stratifying and separating actions proceed, the purified coal forms into a superior stratum, and the rock or other heavier material in a given zone will settle upon the table, will be forwarded by friction and inertia, and will be concentrated at the central forward end of the separating zone, and will pass out through the port 57, the regulating means at the port being set so as to permit the discharge of all of the separated rock and to prevent the discharge of any of the coal. The action of the table in this wise may be very carefully inspected by watching the chambers 79 and 85. The coal or other superior stratum of separated material will flow forwardly over the deflecting walls 58 and 59 for the rock or other heavier material, and will pass forwardly along the table.

It will be understood that the foregoing is a general outline of the action of the table under certain conditions and is explanatory of one manner of operating the table, but is not restrictive as to the uses of the table or as to all conditions and actions of different kinds of intermixed materials undergoing separation.

From all the foregoing it will be understood that a mechanism has been provided constituting an exemplary embodiment of the invention, and realizing the objects and advantages herein set forth, together with other objects and advantages. It will be understood further that departures may be made from the exact mechanism as shown and described, within the scope of the accompanying claim, without departing from the principles of the invention and without sacrificing its chief advantages.

What I claim is:—

A mechanism for purifying coal including in combination an air-pervious table, an air chamber underlying substantially the entire table, means for supplying air under pressure to the chamber, a plurality of compartments in the upper part of the air chamber, said compartments being disposed in a longitudinal series along the length of the table, and means for regulating the air current flow upwardly through the chambers to the table comprising longitudinal series of rotatable vanes mounted in each of the bottoms of the compartments, and subtending substantially the entire area thereof and control means operable from outside the air chamber for positioning the vanes for one compartment independently of those for the other compartments to thereby regulate the supply of air to substantially independent areas longitudinally of the table.

REMBRANDT PEALE, Jr.